(No Model.) 4 Sheets—Sheet 1.

R. HAKEWESSELL & E. C. HENN.
SCREW SLOTTING MACHINE.

No. 551,119. Patented Dec. 10, 1895.

Fig. 1.

Witnesses:
J. S. Bowen.
Fred. J. Dole.

Inventors:
Reinhold Hakewessell,
Edwin C. Henn,
by their Attorney F. A. Richards.

(No Model.) 4 Sheets—Sheet 2.

R. HAKEWESSELL & E. C. HENN.
SCREW SLOTTING MACHINE.

No. 551,119. Patented Dec. 10, 1895.

Witnesses:
J. S. Bowen
Fred. J. Dole

Inventors:
Reinhold Hakewessell,
Edwin C. Henn,
by his Attorney,
F. H. Richards.

UNITED STATES PATENT OFFICE.

REINHOLD HAKEWESSELL AND EDWIN C. HENN, OF HARTFORD, CONNECTICUT.

SCREW-SLOTTING MACHINE.

SPECIFICATION forming part of Letters Patent No. 551,119, dated December 10, 1895.

Application filed June 13, 1895. Serial No. 552,670. (No model.)

*To all whom it may concern:*

Be it known that we, REINHOLD HAKEWESSELL and EDWIN C. HENN, citizens of the United States, residing at Hartford, in the county of Hartford and State of Connecticut, have invented certain new and useful Improvements in Screw-Slotting Machines, of which the following is a specification.

This invention relates to improvements in screw-slotting machines, and is in the nature of an improvement upon the screw-making machine described in Letters Patent to Edwin C. Henn, No. 530,180, and dated December 4, 1894, and is adapted for attachment thereto; and the object of the invention is to provide a screw-slotting machine which will be automatic in its operation, and which will perform its necessary work in connection with a reciprocating tool-carriage supporting a rotating tool or tools and in connection with a rotary work carriage or turret carrying a rotating work spindle or spindles—such, for instance, as shown by said patent above mentioned.

Another object of this invention is to provide an automatic screw-slotting mechanism adapted to receive the screws automatically from the work-carrying spindles and slot the same, while the ordinary threading and heading operations of the machine are being performed, and without stopping such machine.

A further object of the invention is to provide, embodied in such screw-slotting mechanism, and in connection with a reciprocating frame or tool-carrier, a rotary chuck-carrier, an automatically-operable chuck-opening mechanism, an automatically-operable screw-centering guide mechanism, an automatically-operable slotting device for slotting the screws carried by the rotary chuck-carrier, and an automatically-operable screw-ejecting mechanism, said chuck-carrier and mechanisms all being operated on the reciprocation of the tool-carrier.

In the drawings accompanying and forming part of this specification, Fig. 7 is a similar view to Fig. 6, showing, however, the chuck-centering guide in its non-centering position, the tool-carriage having moved a short distance in its backward movement.

Like characters represent like parts in all the figures of the drawings.

The screw-slotting mechanism herein shown and described is adapted for attachment to a screw-making machine having a reciprocating tool-carriage and tool-carrying head in connection with a rotating work-carrier, and by slight modifications of its construction can be attached to the ordinary machines of this class; but, as herein shown, it is preferably adapted for attachment to a screw-making machine such as shown in the patent above referred to, and of which screw-making machine a description is herein given sufficient to show the attachment and operation of the automatic screw-slotting mechanism.

The framework of the machine, which is designated in a general way by A, may be of any suitable form and construction adapted for carrying the several details of the mechanism. In the preferred form thereof shown and herein described it consists of a bed comprising the two side rails 2 and 4 and suitable end rails connected to said side rails, said rails being supported upon suitable legs, the usual oil-pan 5 being shown as located underneath the working parts of the machine and as forming the base portion of said machine.

Figure 1:
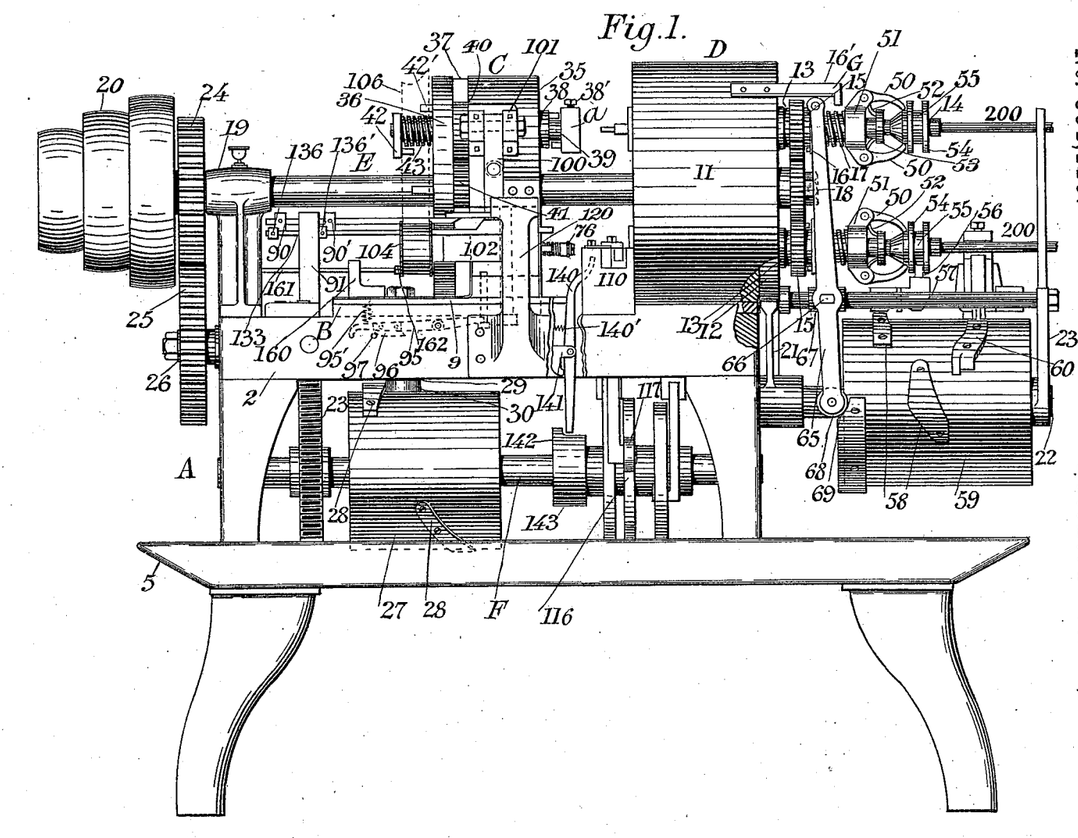
Figure 1 is a side elevation of a screw-making machine—such, for instance, as shown in the patent above referred to—having attached thereto this improved screw-slotting mechanism, a portion of said figure being broken away to show a part of the operating mechanism of the screw-slotting mechanism and the operating mechanism for the work-carrying head, and said figure showing the parts of the machine in the position of rest or non-operation.
Figure 2:
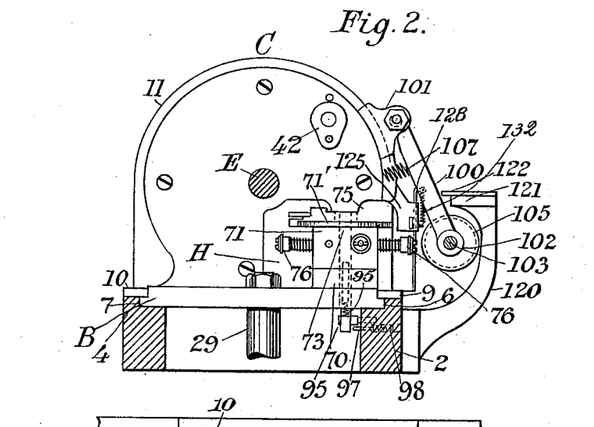
Fig. 2 is an end elevation of the tool-carrying head and the improved screw-slotting mechanism in connection therewith, taken in line *a a*, Fig. 1, and looking toward the right hand in said Fig. 1, the driving mechanism for the same being removed, the side rails of the frame, the main driving-shaft and the saw-shaft being shown in section.

Formed in the side rails 2 and 4 of the machine are the usual longitudinal slideways 6 and 7, fitted to which and held in place by the usual straps 9 and 10 is a longitudinally-sliding tool-carriage B, having the tool-carrying head C at or near the forward end thereof, as shown in Fig. 1 of the drawings. In the preferred form thereof shown this head C is adapted to carry a series of tools supported equidistantly about a common center, one of said tools—viz., the screw-threading tool, (designated by $a$)—being rotatably supported in said tool-carrying head, as will hereinafter be more particularly described.

The work-spindle-carrying head or "turret" D is rotatably supported in a horizontal bearing in an upright 11, preferably formed integral with the bed or frame of the machine near the forward end thereof. This spindle-carrying head D has secured to or formed upon its forward end, concentric to the axis thereof, a spur or driving-wheel 12. Formed longitudinally through said turret D are a series of sockets or bearings, and in each of which sockets is journaled a tubular shaft or sleeve 13, which in practice will be flanged at its inner end and bear against the face of the turret D to prevent longitudinal movement thereof.

By the terms "inner ends" and "outer ends," as applied to certain of the parts of the tool-carrier and of the spindle-carrier, is meant those ends adjacent to the space between the tool-carrier and spindle-carrier and those ends most remote therefrom, respectively.

The tubular shaft or sleeve 13 is conically bored at its inner end and has a split chuck-sleeve or work-carrying spindle 14, fitted for sliding movement therein, which spindle has its inner end flared or conically flanged peripherally to coincide with the conical bore of the tubular shaft. Through this spindle 14 is extended the screw-rod, as 200, to be operated upon.

The mechanism for rotating the spindles comprises pinions 15, loosely mounted upon the outer ends of the tubular shafts 13, said pinions being constructed to form clutch members adapted for engagement with other clutch members 16, which, in the form thereof shown, consists of a peripherally-grooved pulley or wheel splined to the outer end of the shaft 13. These clutch members are each provided with inwardly-projecting clutch-pins, which are normally held in engagement one with the other by means of a spiral spring 17, bearing against the outer face of the clutch member 16.

A number of spindle-carriers may be supported by the tool-carrying head, coinciding to the number of working tools carried by the tool-carriage; but in the preferred form thereof, as shown and described in the patent above referred to, the work-carriage has four such spindle-carriers equidistantly disposed around a common center and rotatably supported therein. These spindles, clutches, and driving-wheels are therefore substantial duplicates of one another and are simultaneously driven by a gear-wheel 18, secured to the forward end of the main driving-shaft E of the machine, which shaft is journaled at its forward end in the work-carrying head or turret D, and at its rear end in a bearing 19, secured to or forming a part of the bed of the machine. This shaft E extends through the tool-carrying head, as shown in Fig. 1 of the drawings, and is provided at its rear end with the usual driving-pulley 20.

Through mechanism hereinafter described the work-carrying spindles not only have an intermittent rotary movement about a common axis, but will also be constructed and provided with mechanism whereby each spindle will have a rotary movement about its individual axis, which will be interrupted at predetermined points in its orbital movement, or in its travel about the common axis E. This intermittent orbital movement is imparted to the series of work-carrying spindles for the purpose of bringing the screw-rods carried by said spindles successively into axial alignment with, and in position for being successively operated upon by, the successive tools of the tool-carrying head, and also into position to be received by the chuck of the rotary chuck-carrier to be slotted. As a means for securing this intermittent orbital movement to the work-carrying spindles about a common axis, a segmental gear-wheel 21 is provided, which, as shown in Fig. 1 of the drawings, is carried upon a counter-shaft 22, journaled at one end in a bracket or hanger 23, which may be secured to the framework in any suitable manner, and is supported at its opposite end in a bearing formed in the end wall of the framwork, as will be seen by reference to Fig. 1 of the drawings. This segmental gear-wheel is constructed and is in position to mesh with the spur-wheel 12 upon, and to intermittently rotate, the working carrying-head D a distance equal to the distance between the work-carrying spindles at each complete revolution of the counter-shaft 22. In other words, the toothed segment whose teeth coincide with the teeth of the spur-wheel 12 is of sufficient length to rotate said spur-wheel 12 and the connected carrier D a predetermined distance at each complete revolution of the shaft 22, which is herein shown as one-fourth of a revolution, and to allow said head to remain stationary the proper length of time for the tools to complete their work upon the ends of the various screw-rods. Any suitable locking device will be provided for engaging and locking the turret or spindle-carrier in its successive operative positions and against rotation such as shown, for instance, in said patent above referred to.

The extent of rotation of the turret at each revolution of the shaft 22 and the length of time intervening between movements thereof will depend, as hereinbefore stated, upon the number of work-carrying spindles and screw-forming tools employed.

A suitable pinion is secured to the inner end of the segmental-gear shaft 22 and meshes with a suitable pinion secured upon the forward end of the cam-shaft F, whereby the segmental gear will be operated. The cam-shaft F is journaled in bearings at its either end in the framework, as shown in Fig. 1 of the drawings, and has near the end thereof a worm-wheel 23, which meshes with and is driven by suitable worm and gear mechanism (not shown) in operative connection with the spur-wheel 24 on the shaft E by means of the gear-wheel 25, mounted upon a shaft 26, the shaft E being driven, as before stated, by the driving-pulley 20 at the rear end thereof.

As a means for actuating and governing the sliding tool-carriage B a cam-wheel 27 is provided, which is secured to the cam-shaft F, and has cam-faces 28. A stud 29, secured at its upper end to the tool-carriage B, is provided to secure an operative connection between said cam and tool-carriage, said stud being preferably provided with a friction-roller 30 at its lower end, which bears against the cam-faces of the cam-wheel 27. This cam-wheel may be of any suitable construction adapted for imparting the required forward and return movements to the tool-carriage. In the form thereof herein shown the tool-carriage head is constructed in two pieces—viz., the forward or main portion 35, secured to or forming a part of the tool-carriage, and the back plate 36, secured to the tool-carrier head by means of suitable screws—a series of blocks 37 being interposed between said plate and tool-head proper to provide sufficient space between said head and plate for the interposition of tool-driving mechanism.

Any suitable number of working tools may be supported by the tool-carriage; but the tool-head is usually and preferably constructed to carry three successive working tools—viz., a gage-tool, if desired, for determining the length of the screw, a cutting-tool for reducing the diameter of the end of the rod, and a screw-threading die for cutting the thread and for finishing the screw; but for the purpose of illustrating this invention, it is only necessary to show in the drawings the screw-threading die, which is designated as $a$. The gage and forming-die will, usually, in practice, be non-rotative; but the screw-threading die $a$ will be supported for rotary movement in the tool-carrier head.

The mechanism for moving the tool-carriage toward and from the work-carrier and the mechanism for intermittently rotating the work-carrier will be so timed in their movements with relation to each other that, immediately after the completion of a partial rotation of the work-carrier to bring the spindles thereof to an operative position in alignment with the tools, the tool-carriage will be moved toward the work-carrier with its tools in engagement with the several screw-rods carried by said carrier, each tool performing its own function, and immediately after the tools have completed their operation the tool-carriage will at once be retracted, and after the tools have passed the end of the screw-rods on the retractive movement of said carriage the work-carrier will be again rotated, as in the first instance, in a manner similar to the operation set forth in the patent above referred to.

The improved means for facilitating the cutting of the thread upon the screw-rod, as set forth in said patent above referred to, comprises a sleeve or tubular shaft supported in a socket in the tool-carrying head and extends through both parts 35 and 36 thereof. This shaft is provided at its inner end with one member of a pull-off or pin clutch device 38, adapted for engaging a like clutch member upon the die-head 38', which die-head is secured to a die-spindle 39, rotatably supported in the sleeve or shaft. Secured to the spindle-driving shaft between the front and back plates 35 and 36 of the tool-carrying head is a pinion 40, which meshes with and is driven from a gear-wheel 41, splined to the main shaft E of the machine, as shown in Fig. 1. This splined connection between the gear-wheel 41 and shaft E permits said gear-wheel to be rotated with the shaft during the reciprocation of the tool-carriage B. The die-spindle 39 extends beyond the outer end of the spindle-shaft and is provided at this end with a clutch member 42, adapted for engagement with a clutch member 42', secured to the back plate 36 of the tool-carrying head.

Suitable means are provided for retaining the two clutch members at the inner ends thereof normally in engagement—such as a spring 43, placed between the back plate 36 and clutch member 42 at the opposite outer end of the die-spindle—this arrangement normally retaining the die-spindle in operative engagement with its driving-shaft.

By reference to the drawings it will be seen that the die-spindle, through the medium of the clutch at the inner end thereof, is continuously driven by the sleeve or shaft carrying the pinion 40 when the die is not operating to cut the thread upon the screw-rod, and also that the two clutches, one at either end of said die-spindle, are adapted for alternate operation.

In cutting the thread upon the screw-rod, the work-carrying spindle, when opposite the threading-die, will be held against rotation by a suitable locking device, hereinbefore mentioned, after which the rotating threading-die is moved forward with the tool carriage into engagement with the inner end of the rod and carried forward until the thread is completed, or approximately so, when the movement of the tool-carriage is reversed, which throws the two clutch members 38 and 38' contiguous to the threading-die out of engagement, and brings the two clutch members 42 and 42' at the opposite end of the die-spindle into engagement, which immediately stops the rotation of the die. At this time the screw-rod carrying-spindle is started to rotate in a direction coinciding with the former rotation of the screw-threading die, but with a much greater speed than said die, which screws the threading-die off from the threaded rod, and when the screw-threading die has passed off the end of the rod the spring 43 immediately throws the two clutch members 38 and 38' at the inner end of the die-spindle into engagement, and the die then continues its rotation, all of said operations being performed automatically. After the threading-die has performed its work and passed off the screw-rod, the spindle-carrying head is then unlocked and partially rotated to present the screw-threaded rod to the chucks of the chuck-carrier to be rotated to the slotting-saw after the shaping and cutting off mechanism hereinafter described has performed its work.

Any suitable form of clutch mechanism for opening and closing the work-holding chucking-spindles to release and grasp the screw-rods, and also means for automatically grasping and feeding the screw-rods into proper position to be operated, may be used; but the form illustrated in Fig. 1 is substantially similar to the mechanism shown and described in the patent above referred to, which in a general way consists of a set of elbow-levers 50, pivoted upon a collar 51, fitted for sliding movement upon the outer end of the work-carrying spindle 14 and bearing at its inner face against the outer end of the tubular shaft or sleeve 13, journaled in the turret D. These levers have two inwardly-extending arms 52, so disposed with relation to the levers 50 as to be thrown outward as said levers are pushed outward. These arms 52 bear at their inner ends against the inner face of a flange 53, fixed to the outer end of the chuck or working carrying spindles 14, and are adapted, as the levers 50 are thrown outward, to move the spindle outward, bringing the inclined or conical face at the inner end thereof against the conical inner end of the tubular shaft, which compresses the spindle and grasps the screw-rod therein.

Any suitable mechanism may be used for spreading the levers 50, so as to grasp and release the rod, the mechanism herein shown comprising a conical hub 54, loosely journaled upon the outer end of the spindle 14 slightly in advance of said levers, which hub is moved endwise upon said spindle at predetermined intervals for releasing and re-engaging the spindle from and with the screw-rod.

As a means for operating the chuck-spindle mechanism, the hub 54 thereof has an annular groove 55 formed in its periphery to receive the end of a shipper-slide 56, shiftably supported upon a rod 57, secured to the frame of the machine at one side thereof. This shipper-slide is located in position for engagement with the hub 54 of the work-carrying chuck device when the work-carrying spindle is in alignment with the gage or other tool supported in the tool-carrying head. The shipper-slide is actuated by cam-faces 58, mounted on the cam-wheel 59, secured to the end of the counter-shaft 22, said cam-wheel being also provided with a cam-face 60, adapted for operating a suitable rod-gripping device similar to that shown in said patent above referred to.

The work-carrying spindles are all continuously rotated until they come into alignment with the threading-die, the clutch members 15 and 16, one of which is splined to the tubular shaft 13 and the other of which is in the nature of a pinion in constant mesh with the spur-wheel 15 and is loose upon said shaft, being normally held in engagement, as hereinbefore stated, by the spiral spring 17. When the successive work-carrying spindles have arrived in alignment with the threading-die, the clutch members in connection with that particular spindle are automatically thrown out of engagement by means of a shipper-lever 65, which at this particular time engages the member 16. This shipper-lever is pivotally supported at 66 upon a bracket 67 on the rod 57, secured to the frame of the machine, the lower end of said shipper-lever being provided with a roller 68, adapted to be engaged and operated by the cam-face 69 upon the cam-wheel 59, said cam-face being constructed and located upon the cam 59, so as to throw the two clutch members 15 and 16 of the spindle whose rod is being screw-threaded out of engagement, to thereby stop the rotation of the rod-carrier by said spindle while the same is being screw-threaded, and to hold the said rod in such condition until the thread has been completed, after which the shipper-lever is retracted, which throws the two clutch members again into engagement, thus allowing the rod to rotate to unscrew from the threading-die.

Any suitable means may be provided for holding the work-carrying spindle against rotation while the rod is being threaded, such as a clutch device G, one member thereof comprising a pin (not shown) extending laterally from the face of the grooved collar 16, and the other member being shown as an L-shaped projection 16', extending laterally from the upright 11, so that when the shipper-lever 65 disengages the two clutch members 15 and 16 the two members of the clutch device G will be shifted into engagement with each other to prevent the rotation of the work-carrying spindle, and vice versa.

Any suitable mechanism for shaping the head of the screw and for cutting off the same from the screw-rod may be employed. The mechanism herein shown is substantially similar to the mechanism shown by the patent above referred to, and comprises a head 110, supported by the framework of the machine, and having slideways adapted to support two independent cutter-carriers adjustably carried in said slideways, and two independent cutters carried by said carriers, actuating levers for said carriers, and a cam 116 for actuating said levers to bring the two cutters alternately to the work at different angles.

At the lower ends of the carrier-actuators are friction-rollers 117, which bear upon the cam-faces of the cam 116, as shown in Fig. 1, the cam being so constructed and the actuators being so arranged as to first elevate the shaping-cutter to shape the head and subsequently carry the cutter 114 forward to cut off the screw, the screw then being carried by the rotating chuck-carrier to the slotting-saw and slotted and then ejected in finished state.

The principal object of this invention is, however, to provide an automatic screw-slotting mechanism in connection with a screw-thread-cutting machine—such, for instance, as the machine above described or such a mechanism as can be attached to screw-threading machines already in use of this character by slight changes thereof—and of which the following is a description. It consists, briefly, in connection with a suitable reciprocating carrier-frame or tool-carrier, of a rotary chuck-carrier having a chuck or a series of chucks adapted to carry threaded screws, ejecting mechanism for the slotted screws, together with suitable mechanism for rotating the chuck-carrier, locking mechanism for said chuck-carrier, whereby the same will be held against rotation while the screws are being slotted, screw-centering-guide mechanism for the screws held by the chucks, chuck opening or spreading mechanism for spreading the split chucks to permit the reception of the screws and prevent the wearing of the threads thereon while the screws are entering the chucks, and a suitable slotting device or mechanism for slotting the heads of the screws carried by the chucks, the rotary chuck-carrier, the locking mechanism therefor, the centering-guide mechanism for the screws, and the slotting device all being disposed and arranged upon the reciprocating frame or tool-carrier and adapted to be operated on the reciprocation of such frame or tool-carrier, the centering-guide mechanism, the slotting-saw mechanism, the chuck-opening mechanism, and the ejecting mechanism being operated on the forward movement of the tool-carrier or frame, and the locking mechanism for the chuck-carrier and the rotary chuck-carrier with its chuck or series of chucks being operated on the backward movement of the tool-carrier or frame.

In the preferred form thereof shown and described the screw-slotting mechanism is preferably constructed substantially as follows: The tool-carrying head C has a recess or cut-away part H of a shape suitable to contain a portion of the screw-slotting mechanism. In this recess H a suitable base 70, preferably integrally connected with the tool-carriage, is mounted, and upon this base the rotary chuck-carrier 71 is adapted to rotate. Said chuck-carrier is provided with a central aperture 72, into and through which a headed bolt 73 is passed and is adapted to project above the upper side of the rotary chuck-carrier, said bolt being held therein by means of a screw or pin 74, extending through the base 70 and engaging said bolt. The end of this bolt 73 projects into a recess of a downwardly-extending plate or button 75, preferably integrally united to the upper wall of the recess H of the tool-carrying head, and upon the shank of the bolt a suitable pawl-lever carrying a spring-pressed pawl, hereinafter described, is adapted to oscillate.

Figure 8:
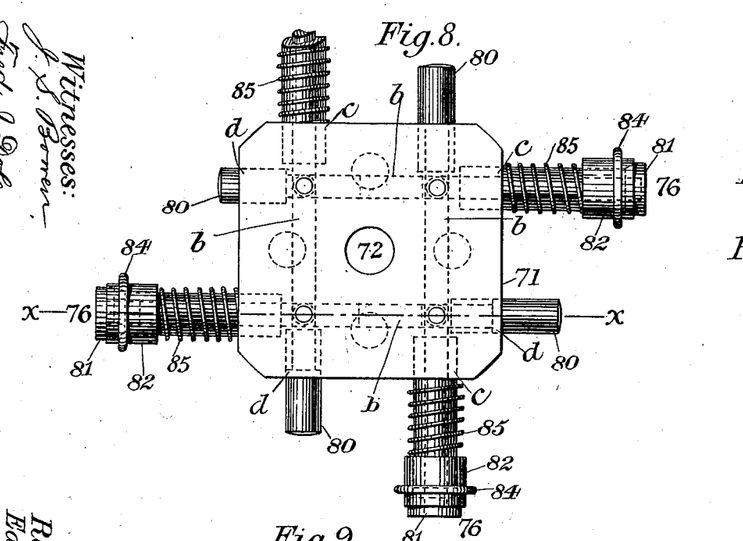
Fig. 8 is an enlarged detail top view of the rotary chuck-carrier and its chucks, one of said chucks being broken off.
Figure 9:
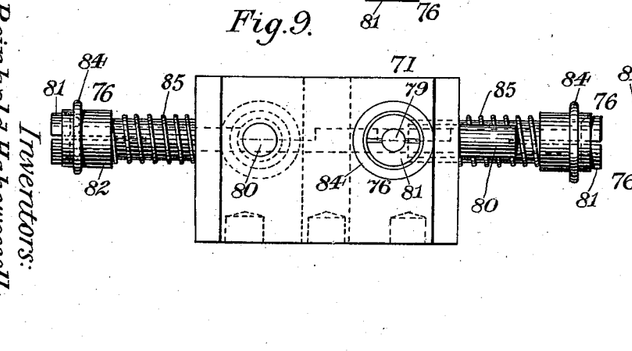
Fig. 9 is a side elevation of the same.
Figures 10, 13:
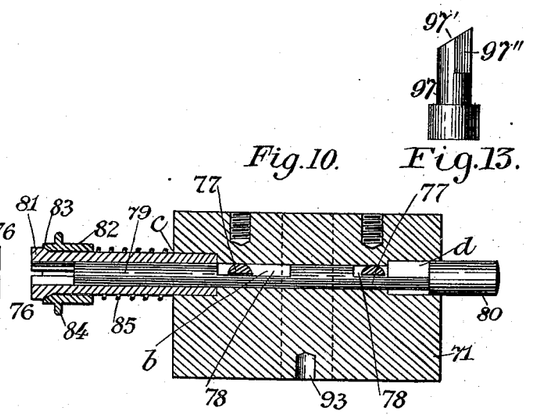
Fig. 10 is a vertical section of the rotary chuck-carrier in line $x$ $x$, Fig. 8, the ejecting mechanism being shown in full lines.
Fig. 13 is a detail view, on an enlarged scale, of the cam-lever stud or bolt for actuating said cam-lever.

The chuck-carrier 71, which may be of any suitable form and construction adapted to carry the necessary chucks, is preferably shown as approximately rectangular in cross-section, and is provided with transverse slots or guideways, preferably four in number, as $b\ b\ b\ b$, extending from side to side of the chuck-carrier and intersecting each other at determined points, (see Fig. 8 of the drawings,) said guideways being adapted to carry suitable chucks and ejecting devices, hereinafter described. It is understood, however, that the chuck-carrier might be adapted to carry more or less than the number of chucks herein stated, if desired, with a very slight change of the actuating mechanism, and hence more or less number of chuck-slots or guideways. The outer ends of the guideways $b$ adjacent to the sides of the chuck-carrier are provided with recesses $c$ and $d$, of larger diameter than the guideways or slots $b$. Into the recesses $c$ the tubular split chucks 76 are adapted to fit and be held therein by any suitable means, preferably by frictional contact with the walls of the recess. These split chucks 76 are herein shown as four in number to correspond to the number of guideways in the chuck-carrier, and are preferably disposed one on each side of the chuck-carrier diagonally opposite each other, said chucks projecting beyond the sides of said carrier. Ejecting-rods 77, having transverse guideways or cut-away parts 78, have a part thereof, as 79, adapted to slide in the chucks 76, and are preferably provided with cylindrical heads 80, having circular convex ends. These rods are adapted to work in the recesses of the chuck-carrier and extend through the slots or guideways in said carrier and have their heads 80 projecting therefrom, and are adapted to intersect or engage each other—that is to say, the guideway or cut-away portion 78 in one ejecting-rod will be adjacent to the guideway or cut-away portion 78 of the other ejecting-rod, said rods extending transversely of each other. (See Figs. 8 and 10.) These sliding ejecting-rods are adapted to extend sufficiently far into the split chucks 76 to eject the screws therefrom by the mechanism hereinafter described after the same have been slotted. Each chuck 76 is provided with an inwardly-tapering exterior head 81, against which tapering head a sleeve or collar 82, provided with a tapering or flared end 83 and with an exterior flange 84, is adapted to abut. A spiral spring 85 encircles said tubular chuck and rests between the chuck-carrier and the inner edge of the collar or tapering sleeve 82, whereby the tapering end of the collar is adapted to abut against the tapering end of the split chuck and compress the same onto the threaded screw. By means of this particular construction of chuck the threaded screw will enter and be received by the chuck without wearing off the threads thereof.

Attached to the upper side of the rotary chuck-carrier is a ratchet-wheel 71', having any desired number of teeth coinciding to the number of chucks supported by the carrier, but is shown having four teeth. This ratchet-wheel 71' may be made integral with the carrier, if desired; but, as shown, it is attached to the carrier by means of screws and has a central aperture concentric to the carrier-aperture, through which the bolt 73 projects, the ratchet-wheel extending somewhat beyond the face of the carrier. A pawl-arm 86, provided with a tubular sleeve 87 at its inner end, is adapted to be journaled on the projecting end of the bolt 73, said arm carrying a spring-pressed pawl 88 at its outer end adapted to engage the teeth of the ratchet-wheel at certain determined points of its movement and rotate said ratchet-wheel, and thereby the chuck-carrier supporting the chucks. A rod 89, provided with suitable check-nuts 90 and 90', has one end thereof reciprocally mounted on the frame A of the machine by a suitable bracket 91 and has the opposite end thereof pivotally connected to the pawl-arm 86 at or near the middle of its length, and is adapted to oscillate said pawl-arm when the check-nuts 90 and 90', respectively, abut against the bracket on the reciprocation of the tool-carriage.

A suitable locking device for permitting intermittent rotary movement of the chuck-carrier and to prevent the rotary movement of said carrier at certain periods in the reciprocation of the tool-carriage is provided and is shown in the preferred form thereof, consisting of a headed stud or bolt 92, extending through the tool-carriage and base 70 thereon and into a recess 93 in the under face of the rotary chuck-carrier 71. This bolt is provided with a socket or aperture adjacent to its lower end. A cam-lever 95 of any suitable construction is pivoted to the inner side of the tool-carriage and is adapted to move therewith, and has its forward end projecting into the socket or aperture of the headed bolt 92, and has a spring 95' in position relatively to the tool-carriage and the outer end of said cam-lever, whereby the forward end of said lever is pressed upwardly and the locking-bolt 92 held in engagemeet with its recess 93 in the chuck-carrier. This cam-lever 95 is provided with a curved cam-arm 96 adjacent to its opposite end.

Figure 3:
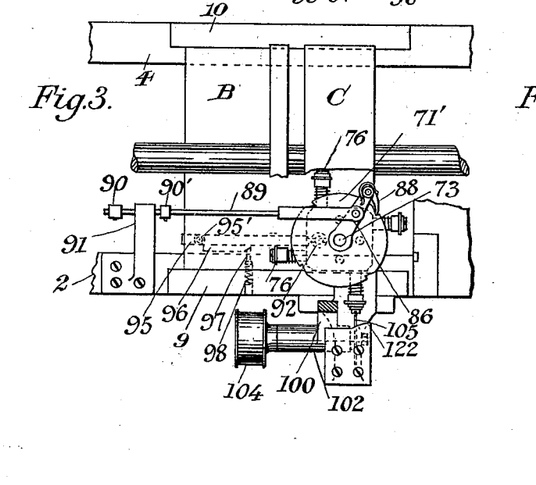
Fig. 3 is a top view of a portion of the screw-machine and illustrating the improved screw-slotting mechanism in connection therewith, parts of said figure being broken away, and in section to more clearly show the invention, said figure showing the chuck-carrier at the end of its quarter rotation after the tool-carriage has moved forward a short distance, and also showing the position of the actuating-pawl for the rotating chuck-carrier, after rotating said chuck-carrier.
Figure 4:
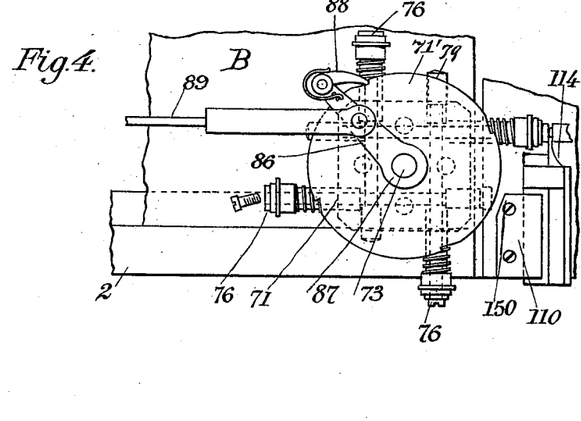
Fig. 4 is also a top view of a portion of the screw-machine, showing the improved rotating chuck-carrier, on an enlarged scale, supporting the screw-holding chuck, said chuck-carrier being shown in the position it assumes when the tool-carriage is in its extreme forward working position, and said figure also showing in operation the mechanism for ejecting a slotted screw, and also showing the chuck-carrier pawl in position to actuate the chuck-carrier a quarter-turn when the tool-carriage commences its backward movement.
Figure 5:
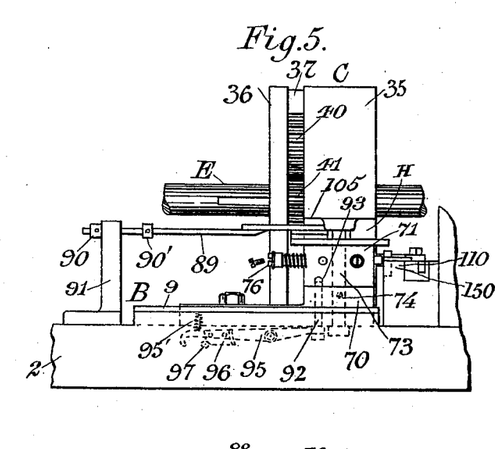
Fig. 5 is a side elevation of a portion of the screw-making machine, showing in side elevation the rotating chuck-carrier supporting the screw-holding chucks and its connecting mechanism, the slotting-saw and its supporting-arm removed, and also showing a screw ejected from one of the chucks of said carrier.
Figures 11, 12, 14:
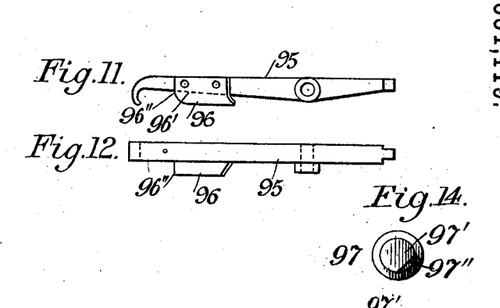
Fig. 11 is a side elevation of the cam-lever for operating the locking device of the rotary chuck-carrier.
Fig. 12 is a top view thereof.
Fig. 14 is also an enlarged view of the beveled end of the same.

A spring-pressed stud 97, provided with a beveled end 97', and also with a beveled face 97" on its periphery, (see Figs. 13 and 14,) is seated in a recess 98 in the side rail of the frame and is adapted to be pressed into the path of the cam-arm 96 of the lever by means of its spring. In the movement of the tool-carriage toward the work-carrying head the curved side face 96' of the cam-arm 96 of the lever 95 presses against the beveled end 97' of the stud 97, and thereby forces said stud inwardly against its spring, whereby said cam-arm 96 is permitted to move past the beveled end 97' of said stud. The stud 97, by means of its spring, is then forced outwardly into its normal position in the rear of such cam-arm 96, (see Figs. 1 and 5,) and in position to have its beveled face 97" engaged by the rear edge 96" of the cam-arm on the movement of said cam-lever 95 with the tool-carriage away from the work-carrying head. On the movement of the tool-carriage away from the work-carrying head the rear edge 96″ of said cam-arm 96 strikes against the beveled face 97″ on the periphery of the projecting stud 97, and said cam-arm rides up said beveled face 97″ and over the periphery of said projecting stud, whereby the forward end of the cam-lever 95, engaging the locking-bolt 92, is, during the passage of the cam-arm 96 over the periphery of the stud, depressed against the pressure of its spring 95′, and the locking-bolt 92 thereby withdrawn from its recess 93 in the chuck-carrier, and said carrier permitted to be rotated and again relocked by the re-entrance of the bolt 92 into its recess 93 after the passage of the cam-arm 96 over the periphery of the projecting bolt or stud 97, (see Fig. 3,) said stud 97 remaining during the passage of the cam-arm in its normal position, with its beveled end 97′ in position to be forced inwardly by the cam-arm 96 on the next movement of the cam-lever with the tool-carriage toward the work-carrying head.

A swinging arm 100 is eccentrically pivoted to a bracket 101, attached to the outer side of the tool-carrying head, and supports at its lower end a transverse sleeve 102, preferably integrally connected to said arm, and in which sleeve a shaft 103, carrying a driving-pulley 104 at one end and a rotary saw 105 adjacent to its opposite end, is journaled. A suitable driving-belt 106, (see dotted lines, Fig. 1,) connected with the source of power, passes around said pulley to rotate the shaft 103, and thereby the saw, to slot the heads of the screws presented to its slotting-edge.

Any other suitable means of connection for rotating the saw may be used, if desired. For instance, instead of the pulley and belt suitable gearing mechanism connecting the saw-shaft with the main driving-shaft E or with the threading die-gearing may be used, if desired. This swinging arm is provided with a spring 107, located between its under side and the side of the tool-carriage head or the upper side of the bracket-arm 125, hereinafter described, whereby said swinging arm will be pressed in outward direction and away from the heads of the screws, and said arm may have a frictional roller attached by suitable means to the outer side thereof adapted to engage the cam-plate 122, hereinafter described, if desired.

A bracket-arm 120 is attached to the side rails of the machine by suitable screws or bolts or made integral therewith, as desired, and has a horizontal plate or flat surface 121 at its upper end, and on which a cam-plate 122, having an inclined or beveled cam face or edge, is mounted, by means of screws, in position to engage the swinging arm 100, carrying the rotary saw and thereby press said arm against the tension of its spring and into position to slot the heads of the screws presented to its cutting-edge.

The screw-slotting mechanism is also provided with a chuck-screw centering-guide mechanism adapted to center the screws during the slotting operation by the saw and thereby steady the screw-heads and permit the heads to be centrally slotted in each instance.

The tool-carrying head is provided with a projecting bracket-arm 125, which may be integrally connected to the head, if desired; but, as shown, it is attached thereto by means of screws. This bracket-arm is preferably located immediately beneath the saw-arm and immediately above the particular chuck that is in position to have its screw slotted, and is provided on its outer side with a vertical slot 126 and with an intersecting transverse recess or slot 127 of a depth and width somewhat greater than that of the vertical slot. In the vertical slot 126 a guide-bar 128, having a bifurcated end 129, adapted to partially encircle or inclose the head of the screw when it is in position to be slotted, is adapted to slide. This bar is provided on one of its faces, preferably its rear face, with a rearwardly-extending stud or pin 130, adapted to project into the transverse slot 127 of the bracket. This guide-bar is held in its sliding position in the vertical slot by a suitable plate 131, attached by screws to the bracket-arm. A spring 132 has one end attached to the bar near the upper end thereof and has its opposite end attached to the slot-closing plate 131, whereby said guide-bar is adapted to be drawn in downwardly direction, so that its bifurcated end will partially encircle the screw-head and thereby steady the same.

A cam-slide 133, provided with an inclined cam-arm 134, adjacent to one of its ends, is reciprocally mounted in the bracket 91 and is adjusted thereon by means of check-nuts 136 and 136′. The opposite end of this cam-slide, with its cam-arm 134, is adapted to slide in the transverse recess or slot 127 of the bracket-arm 125 in the rear of said guide-bar 128, and by means of its cam-arm is adapted to engage the rearwardly-projecting stud or pin 130 on said guide-bar, so that when the tool-carriage is moved in its forward direction the rearwardly-projecting stud will ride down the inclined face of the cam-arm on said cam-slide (see Fig. 6) and be pulled in downwardly direction by its spring 132 into position to guide and hold the screw-head against movement.

An upwardly-projecting plate 129′ is attached to the tool-carrier, and is provided with an inclined edge over which the screw-head is adapted to ride when brought into position to be slotted, whereby the screw may be held firmly in its slotting position by the centering-guide. When the stud 130 rides down the inclined face of the cam-arm, it also pushes said cam-slide outward or toward the bracket 91 until it is stopped by its check-nut 136', (see Fig. 6,) whereby the inclined face of the cam-arm will be in position to immediately raise the guide-bar at the precise time the tool-head commences to slide backward and before the chuck-carrier is rotated.

Suitable mechanism for opening the chucks to permit the same to receive the threaded screws from the work-carrying spindles is provided, and is shown in the preferred form thereof, comprising a lever 140, of any suitable shape adapted for its purpose, pivoted at or near the center of its length to a bracket-arm 141, attached to the frame of the machine by any suitable means. The lower end of this lever 140 is adapted to be engaged by a cam 142 on the cam-wheel 143, fixed on the cam-shaft F, and the upper end of said lever is in position adjacent to the shaping and cutting tools to engage the flange 84 of the collar or sleeve 82 of one of the chucks, and push said tapering collar or sleeve against its spring 85 in the forward movement of the chuck-carrier with the tool-carriage, and thereby permit said split chuck to spread to receive the threaded screw, which has been brought by the rotating work-carrier into position to be operated upon by the shaping and cutting tools, hereinbefore described. The lever 140 is so adjusted with relation to the cam 142 on the cam-wheel 143 that after the threaded end of the screw has been received by the split chuck its entire length said lever will be thrown away from the flange of the collar or sleeve by its spring 140' and permit the sleeve-spring 85 to press said collar or sleeve into its normal chuck-closing position, and thereby close the chuck onto the threaded screw. After the cutting-tool has completely severed the screw from the rod, and as the tool-carriage commences to reciprocate in backward direction, said chuck-carrier, with its threaded and headed screw, is rotated into position to have the screw slotted on the next forward movement of the tool-carriage, when the screw previously slotted will be ejected by means of the cylindrical head 80 of the ejecting-rod 77, diametrically opposite the chuck containing the slotted screw to be ejected, abutting against a stop or abutment 150, preferably of hardened metal, located on the inner side of the tool-head 110, supporting the shaping and cutting tools, whereby the ejecting-rod 77 is forced inwardly and ejects the screw. The ejecting-rod is returned to its normal position on the entrance of a threaded screw into the split chuck.

As a means for preventing the tool-carriage and tool-carrying head from moving forward only a certain predetermined distance, a stop 160 is adjusted onto the tool-carriage and is provided with an aperture near its upper end adapted to receive a rod 161, one end of which is connected to the bearing 19, attached to the frame of the machine, and the other end is provided with a check-nut 162, adapted to abut against said stop when the carriage has reached the end of its forward movement, whereby each screw will be threaded only a certain determinate length.

Figure 6:
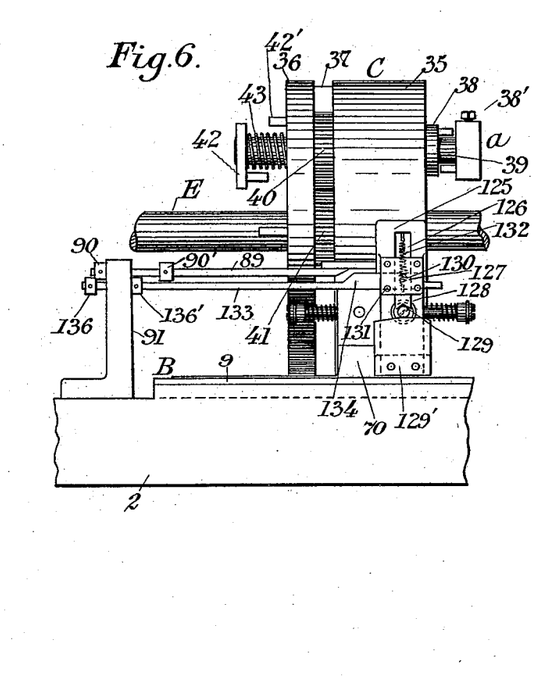
Fig. 6 is a side elevation of a portion of the screw-making machine, showing the tool-carriage and a portion of the improved screw-slotting mechanism in connection therewith and having the slotting-saw and its supporting-arm removed, and also showing the chuck-centering guide and its connecting mechanism in position centering a screw, the tool-carriage being at or near its extreme forward movement.

The operation of the screw-slotting machine is as follows: The work-carrying spindles supported by the work-carrying head having received their rods to be turned into screws, and the rods having been fed forward by the mechanism for that purpose, hereinbefore described, the tool-carriage supporting the tool-head and the end cutting and threading die is reciprocated forward by means of the mechanism for that purpose until the respective rods of the work-spindles are in contact with the working-tools, when, by means of the mechanism hereinbefore described, the threading-die performs its work upon the rod presented to it. When the rod has been threaded its desired length, the tool-head and its carriage commence to reciprocate in backward direction, thereby bringing the two clutch members 42 and 42' at the outer end of the threading-die into engagement and throwing out of engagement the clutch members 38 and 38' at the inner end of said die and thereby stopping the rotation of the die. The work-carrying spindle is then rotated in a direction coinciding with the direction of rotation of the threading-die, but at a greater speed, thereby unscrewing the threaded rod from the threading-die. The clutch members 38 and 38' of the threading-die are then brought into engagement by the pressure of the spring 43 at the rear of the die-spindle. The work-carrying head is then rotated by the mechanism hereinbefore described to present another rod to the threading-die and to bring the threaded rod to the shaping and cutting tools and to one of the chucks of the chuck-carrier to be rotated into position for slotting the same. When the work-carrying head has completed its rotary movement and the rods are in position for the respective working-tools, the tool-carriage is likewise in position to have its tools again operate on said rods, and in the forward movement of the tool-carriage the cam-lever 95, with its cam-arm 96, has passed by the beveled end of the stud 97, said lever and cam-arm being in the position shown in Fig. 5. When the tool-carriage and its head has nearly reached its position to operate on the rods, the chuck-opening lever 140, by means of the cam 142 on the cam-wheel 143, is operated to engage the flange 84 of one of the chucks, and thereby press the same against its sleeve-spring to open or spread said chuck and adapt it to receive the screw, just threaded by the threading-die and rotated by the work-carrying head, into position to be operated upon by the shaping and cutting tools; and on the continued forward movement of the rotary chuck-carrier with the tool-carriage said threaded rod enters one of the chucks and the shaping and cutting tools commence operation, the threading-die in the meanwhile also operating upon another rod. When the threaded end of the screw has been received in the chuck up to the head thereof or such other distance as may be desired, the chuck-opening lever 140 is moved out of positive engagement with the chuck by the cam 142 and its spring 140', above mentioned, thereby releasing the flanged collar or sleeve 82 of the chuck and permitting its spring 85 to force said sleeve forward into position to close the split chuck and firmly hold the threaded screw therein. The shaping and cutting tools having performed their operations and the threaded screw completely severed from the rod, the tool-carriage commences its second backward movement, whereby the cam-arm 96 of the cam-lever 95 rides on the stud or bolt 97 by means of the inclined edge of said stud and thereby withdraws the locking-bolt from the rotary chuck-carrier, and in the continued backward movement of the tool-carriage and tool-head said chuck-carrier is rotated a quarter-turn by means of the pawl 88 on the pawl-arm 86 and lever 89, as will be clearly understood by reference to Fig. 3 of the drawings, the chuck-carrier thereby carrying the threaded screw into position immediately in front of the slotting-saw and the chuck-carrier locked in such position by the locking-bolt 92, engaging the recess of the rotary chuck-carrier after the cam-arm 96 has passed over the stud 97. On the return movement of the tool-carriage and head the chuck carrying the threaded screw, as before stated, is in position to be slotted; but before it is so slotted by the saw the centering-guide bar 128, by means of the inclined cam 134 on the lever 133 and its spring 132, is brought into position, as shown in Fig. 6, to permit its bifurcated end to partially encircle the head of the screw, to thereby steady the same on the inclined edge of the plate 129', over which the head of the screw passed when the chuck was rotated into position to have the head of the screw slotted. On the continued forward movement of the tool-carriage and its head the slotting-saw is brought into position to slot the screw by means of the cam 122 on the bracket-arm 120, and whereby the screw is slotted, power having been applied to the driving-pulley 104 of the saw-shaft. While this particular screw is being slotted, the same operations are being performed on the next screw of the series, so that when the second screw of the series has been received by the second chuck of the rotary chuck-carrier and rotated into position to be slotted, when the carriage moves forward for the threading-die to perform its work on the third screw of the series, the first screw has been rotated by the rotary movement of the chuck-carrier, which brought the second screw into its slotting position to the rear of the tool-head, and at this point it is ejected from its split chuck by one of the ejecting-rods 77, the end of the cylindrical head 80 thereof striking or abutting against the hardened-metal surface 150 of the shaping-tool head 110, thereby forcing said rod inward and ejecting the screw, said ejecting-rod being returned to its normal position, as hereinbefore stated, by the entrance of the next threaded screw received by this particular chuck from the work-carrying spindle.

The foregoing operations are repeated for the formation of each completed screw, and the mechanism so timed as to have each part thereof perform its proper work in its proper time.

Having thus described our invention, we claim—

1. In a screw-slotting machine, the combination with a rotary work-carrier having a rotating work-carrying spindle; of a reciprocating tool-carrier having a rotating working-tool; a chuck-carrier adapted to receive a threaded screw; a slotting device in automatic connection with, and adapted to be operated on the reciprocation of, said tool-carrier, to slot the head of the screw carried by said chuck; and mechanism for actuating said slotting device and chuck-carrier.

2. In a screw-slotting machine, the combination with a rotary work-carrier having a rotating work-carrying spindle; of a reciprocating tool-carrier also having a rotating working-tool; a rotary chuck-carrier having a series of chucks adapted to receive threaded-screws; mechanism for rotating said chuck-carrier on the reciprocation of said tool-carrier; a slotting device for slotting the screws carried by said chucks; and mechanism for actuating said slotting device.

3. In a screw-slotting machine, the combination with a rotary work-carrier having a rotating work-carrying spindle; of a reciprocating tool-carrier also having a rotating working-tool; a rotary chuck-carrier having a chuck adapted to receive a threaded-screw; mechanism for rotating said rotary chuck-carrier on the reciprocation of said tool-carrier; a slotting device adapted to slot a screw carried by the chuck of said rotary chuck-carrier; and mechanism for actuating said slotting device.

4. In a screw-slotting machine, the combition with a vertically rotating work-carrier having a rotating work-carrying spindle; of a reciprocating tool-carrier also having a rotating working-tool; a horizontally rotating chuck-carrier having a chuck adapted to receive a threaded-screw; mechanism for rotating said chuck-carrier on the reciprocation of said tool-carrier; a slotting device adapted to slot the screws carried by the chuck, and mechanism for actuating said slotting device.

5. In a screw-slotting machine, the combination with a vertically-rotating work-carrier having a rotating work-carrying spindle; of a reciprocating tool-carrier also having a rotating working-tool; a horizontally-rotating chuck-carrier having a chuck adapted to receive a threaded-screw, and supported on and rotated on the reciprocation of the tool-carrier; a slotting device also supported on and operated on the reciprocation of said tool-carrier; and mechanism for actuating said slotting device.

6. In a screw-slotting machine, the combition with a vertically-rotating work-carrier having a rotating work-carrying spindle; of a reciprocating tool-carrier also having a rotating working-tool; a horizontally-rotating chuck-carrier having a chuck adapted to receive a threaded-screw, and supported on and rotated on the reciprocation of the tool-carrier; a slotting device also supported on and operated on the reciprocation of the tool-carrier; and a centering-guide for the screw carried by said chuck and also supported on and operated on the reciprocation of said tool carrier.

7. In a screw-slotting machine, the combination with a rotary work-carrier having a rotating work-carrying spindle; of a reciprocating tool-carrier also having a rotating working-tool; a rotary chuck-carrier having a chuck adapted to receive a threaded-screw; mechanism for rotating said rotary chuck-carrier on the reciprocation of said tool-carrier; and a slotting device carried by said tool-carrier and adapted to slot a screw carried by the chuck of said rotary chuck-carrier.

8. In a screw-slotting machine, the combination with a work-carrier, and a reciprocating tool-carrier; of a screw-slotting mechanism in automatic connection with said tool-carrier, and embodying means for actuating said screw-slotting mechanism on the reciprocation of said tool-carrier, to permit said mechanism to receive a threaded screw, to carry said screw into position to be slotted, to center the same, to slot the same, and to eject the slotted screw.

9. In a screw-slotting machine, the combination with a rotary work-carrier having a rotating work-carrying spindle; of a reciprocating tool-carrier having a rotating working-tool; a slotting device carried by, and operated on the reciprocation of said tool-carrier; and means for carrying a threaded screw into position to be slotted.

10. In a screw-slotting machine, the combination with a rotary work-carrier having a rotating work-carrying spindle; of a reciprocating tool-carrier, also having a rotating working-tool; a rotary chuck-carrier having a chuck adapted to receive a threaded-screw; mechanism for rotating said rotary chuck-carrier on the reciprocation of said tool-carrier; a slotting device supported on and operated on the reciprocation of said tool-carrier; and a centering-guide for the screw carried by said chuck and also supported on and adapted to be operated on the reciprocation of said tool-carrier.

11. In a screw-slotting machine, the combination with a rotary work-carrier having a rotating work-carrying spindle; of a reciprocating tool-carrier, also having a rotating working-tool; a rotary chuck-carrier having a chuck adapted to receive a threaded-screw and adapted to be rotated on the reciprocation of said tool-carrier; and a centering-guide for the screw carried by said chuck and supported on and adapted to be operated on the reciprocations of said tool-carrier.

12. In a screw-slotting machine, the combination with a rotary work-carrier having a rotating work-carrying spindle; of a reciprocating tool-carrier also having a rotating working-tool; a rotary chuck-carrier having a chuck adapted to receive a threaded-screw and adapted to be rotated on the reciprocation of said tool-carrier; a centering-guide for the screw carried by the chuck and supported on and adapted to be operated on the reciprocation of said tool-carrier; and chuck-opening mechanism adapted to spread the chuck to permit the same to receive a screw.

13. In a screw-slotting machine, the combination with a rotary work-carrier having a rotating work-carrying spindle; of a reciprocating tool-carrier also having a rotating working-tool; a rotary chuck-carrier supported on and adapted to be rotated on the reciprocation of said tool-carrier and having a chuck adapted to receive a threaded screw; a slotting device also supported on and adapted to be operated on the reciprocation of said tool-carrier; and a centering-guide for the screw carried by said chuck and also supported on and adapted to be operated on the reciprocation of said tool-carrier.

14. In a screw-slotting machine, the combination with a reciprocating tool-carrier; of a rotary chuck-carrier suppported on and adapted to be rotated on the reciprocation of said tool-carrier, and having a chuck adapted to receive a threaded-screw; a slotting device also supported on and adapted to be operated on the reciprocation of said tool-carrier; and a centering-guide for the screw carried by said chuck and also supported on and adapted to be operated on the reciprocation of said tool-carrier.

15. In a screw slotting machine, the combination with a rotary chuck-carrier having intersecting, transverse slots; of chucks supported by said carrier; ejecting-rods working in said slots and in the chucks; and means for rotating said carrier.

16. In a screw-slotting machine, the combination with a rotary chuck-carrier having intersecting, transverse slots, each of said slots having differential diameters, of chucks supported by said carrier, and adapted to engage the forward walls of said slots; ejecting-rods working in said slots and in the chucks; means for rotating said carrier; and mechanism for slotting the screws carried by said chucks.

17. In a screw-slotting machine, the combination with a rotary chuck-carrier having intersecting, transverse slots, each of said slots having differential diameters; of chucks supported by said carrier and adapted to engage the forward walls of said slots; ejecting-rods working in said slots and in the chucks and having heads of larger diameter than said rods and adapted to engage the rearward walls of said slots; and means for rotating said carrier.

18. In a screw-slotting machine, the combination with a rotary chuck-carrier, having intersecting, transverse slots; of chucks supported by said carrier; ejecting-rods working in said slots and in the chucks, each rod thereof having a cutaway portion adapted to engage the cutaway portion of the intersecting-rod; and means for rotating said carrier.

19. In a screw-slotting machine, the combination with a rotary chuck-carrier, having intersecting, transverse slots, each of said slots having differential diameters; of chucks supported by said carrier and adapted to engage the walls of said slots; ejecting-rods working in said slots, and in the chucks, each of said rods having a cutaway portion adapted to engage the cutaway portion of the intersecting-rod, and also having enlarged heads adapted to engage the walls of said slots; means for rotating said carrier; and mechanism for slotting the screws carried by said chucks.

20. In a screw-slotting machine, the combination with a reciprocating and rotating chuck-carrier; of a split-chuck supported by said carrier, said chuck having an exteriorly rearwardly tapering head; a flanged-sleeve adapted to slide on said chuck and having an interiorly-tapered end adapted to engage the tapering end of the chuck-head; a spring mounted on said chuck between the sleeve and the chuck-carrier; means for reciprocating and rotating said carrier; and chuck-opening mechanism adapted to engage the flange of said sleeve and press said sleeve against its spring to open the chuck for the reception of a screw on the reciprocation of the carrier.

21. In a screw-slotting machine, the combination with a reciprocating and rotating chuck-carrier, having intersecting transverse slots extending from side to side of said carrier; of chucks supported by said carrier; ejecting-rods working in said slots and in the chucks, and adapted to eject the screws carried by said chucks on the reciprocation of said carrier; and means for reciprocating and rotating said carrier.

22. In a screw-slotting machine, the combination with a reciprocating and rotating chuck-carrier, having intersecting, transverse slots extending from side to side of said carrier; of chucks supported by said carrier and adapted to engage the walls of said slots; ejecting-rods adapted to work in said slots, and in the chucks, each of said rods having a cutaway portion adapted to engage the cutaway portion of the intersecting-rod; means for actuating said ejecting-rods on the reciprocation of said carrier; means for reciprocating and rotating said carrier; and mechanism for slotting the screws carried by said chucks.

23. In a screw-slotting machine, the combination with a reciprocating and rotating chuck-carrier having a slot of differential diameters extending from side to side of said carrier; of a chuck supported by said carrier and adapted to engage the forward walls of said slot; an ejecting-rod working in said slot and chuck, said rod having an enlarged head adapted to engage the rearward walls of said slot; means for actuating said rod on the reciprocation of said carrier; and means for reciprocating and rotating said carrier.

24. In a screw-slotting machine, the combination with a reciprocating tool-carrier carrying a rotating working-tool, and a rotary work-carrier carrying a rotating work-carrying spindle; of a rotary chuck-carrier having a ratchet fixed thereon; means for actuating said ratchet and thereby the chuck-carrier on the reciprocation of said tool-carrier; a chuck supported by said chuck-carrier and adapted to carry a screw; and means for reciprocating said tool-carrier.

25. In a screw-slotting machine, the combination with a reciprocating tool-carrier; of a rotary chuck-carrier having a chuck adapted to receive a threaded-screw; mechanism for rotating said rotary chuck-carrier on the reciprocation of the said tool-carrier; and a centering-guide mechanism for the screw carried by said chuck and adapted to be operated on the reciprocation of said tool-carrier.

26. In a screw-slotting machine, the combination with the frame thereof; of a reciprocating tool-carrier; a rotating chuck-carrier supported on said tool-carrier; a ratchet-wheel fixed to said chuck-carrier and adapted to rotate therewith; a pawl-arm independently mounted on said ratchet-wheel and having a pawl in engagement with the teeth thereof; a rod connecting said pawl-arm with the frame of the machine; means for reciprocating said tool-carrier, whereby on the reciprocation of said tool-carrier, the chuck-carrier will be rotated; a chuck carried by said carrier; and mechanism for slotting the screw carried by said chuck.

27. In a screw-slotting machine, the combination with the frame thereof; of a reciprocating and rotating chuck-carrier having a chuck thereon; a ratchet-wheel fixed to said chuck-carrier and adapted to rotate therewith; a pawl-arm independently mounted on said ratchet-wheel and having a pawl in engagement with the teeth thereof; a rod connecting said pawl-arm with the frame of the machine; and means for reciprocating said chuck-carrier, whereby on the reciprocation thereof, said carrier will be rotated.

28. In a screw-slotting machine, the combination with a rotary chuck-carrier having intersecting, transverse slots, each of said slots having differential diameters; of chucks supported by said carrier; ejecting-rods working in said slots and in the chucks, and having enlarged heads adapted to engage the rearward walls of said slots; and means for rotating said carrier.

29. In a screw-slotting machine, the combination with a rotary chuck-carrier, having intersecting, transverse slots; of chucks supported by said carrier; ejecting-rods working in said slots and in the chucks, each of said rods having a cutaway portion adapted to engage the cutaway portion of the intersecting-rod; means for actuating said ejecting-rods; and means for rotating said carrier.

30. In a screw-slotting machine, the combination with a rotary chuck-carrier, having intersecting, transverse slots, each of said slots having differential diameters; of chucks supported by said carrier and adapted to engage the walls of said slots; ejecting-rods working in said slots and in the chucks, each of said rods having a cutaway portion adapted to engage the cutaway portion of the intersecting-rod, and also having enlarged heads adapted to engage the walls of said slots; means for actuating said rods; means for rotating said carrier; and mechanism for slotting the screws carried by said chucks.

31. In a screw-slotting machine, the combination with a reciprocating and horizontally rotating chuck-carrier; of a split-chuck supported by said carrier, said chuck having an exteriorly rearwardly-tapering head; a sleeve adapted to slide on said chuck, and having an interiorly-tapered end adapted to engage the tapering head of the chuck; a spring mounted on said chuck between the sleeve and the chuck-carrier; means for reciprocating and thereby rotating said carrier; chuck-opening mechanism adapted to engage the sleeve adjacent to the screw-receiving end of the chuck and press said sleeve against its spring to open the chuck for the reception of a screw; and mechanism for slotting a screw carried by said chuck.

32. In a screw-slotting machine, the combination with a work-carrier and a reciprocating tool-carrier; of a rotary chuck-carrier adapted to carry a threaded screw; mechanism for rotating said rotary chuck-carrier on the reciprocation of said tool-carrier; a slotting device for slotting the screws carried by said chuck-carrier, and supported on, and movable with, said reciprocating tool-carrier; and mechanism for actuating said slotting device on the reciprocation of said tool-carrier.

33. In a screw-slotting machine, the combination with a reciprocating tool-carrier; of a rotary chuck-carrier supported on and adapted to be rotated on the reciprocation of said tool-carrier, said chuck having intersecting, transverse slots; chucks supported by said carrier and adapted to engage the walls of said slots; ejecting-rods working in said slots and in the chucks; means for actuating said ejecting-rods on the reciprocation of said tool-carrier to eject the screws from said chucks; and means for reciprocating said tool-carrier, whereby the chuck-carrier will be rotated.

34. In a screw-slotting machine, the combination with a reciprocating tool-carrier; of a rotary chuck-carrier supported by and adapted to be rotated on the reciprocation of said tool-carrier, said chuck having intersecting, transverse slots; chucks supported by said carrier and adapted to engage the walls of said slots; ejecting-rods working in said slots and in the chucks, each of said rods having a cutaway portion adapted to engage the cutaway portion of the intersecting-rod; means for reciprocating said tool-carrier, whereby the chuck-carrier will be rotated; means for actuating said ejecting-rods on the reciprocation of said tool-carrier; and mechanism for slotting the screws carried by said chucks.

35. In a screw-slotting machine, the combination with a rotating work-carrier having a rotating work-carrying spindle; of a reciprocating tool-carrier also having a rotating working-tool; a rotary chuck-carrier supported on and adapted to be rotated on the reciprocation of said tool-carrier; a chuck supported by said chuck-carrier, and adapted to carry screws; a screw-centering guide supported by said tool-carrier for centering the screws carried by said chuck comprising a spring-actuated guide-bar having a bifurcated lower end, adapted to partially encircle the screw-head carried by the chuck; and a cam-slide provided with a cam-arm for actuating said guide-bar on the reciprocation of said tool-carrier.

36. In a screw-slotting machine, the combination with a rotating work-carrier having a rotating work-carrying spindle; of a reciprocating tool-carrier also having a rotating working-tool; a rotary chuck-carrier supported on and adapted to be rotated on the reciprocation of said tool-carrier; a chuck supported by said chuck-carrier and adapted to carry screws, said tool-carrier being provided with a vertical and with a transverse recess intersecting each other; a spring-actuated guide-bar sliding in said vertical recess and adapted to center the screws carried by said chuck; means for holding said bar therein; a cam-slide provided with a cam-arm sliding in said transverse recess and adapted to engage said sliding-bar on the reciprocation of said tool-carrier, to raise and lower said guide-bar; and mechanism for slotting the screws carried by said chuck.

37. In a screw-slotting machine, the combination with the frame; of a rotating work-carrier having a rotating work-carrying spindle; a reciprocating tool-carrier also having a rotating working-tool; a rotary chuck-carrier supported on and adapted to be rotated on the reciprocation of said tool-carrier; a chuck supported by said chuck-carrier and adapted to carry screws; said tool-carrier being provided with a vertical and with a transverse recess intersecting each other; a spring-actuated guide-bar provided with a bifurcated lower end and with a projecting-stud adapted to slide in said vertical recess and center the screws carried by said chuck; means for holding said bar therein; a cam-arm, provided with an inclined cam adjacent to one end thereof, adapted to slide in said transverse rier-frame and thereby rotating said chuck-carrier to present the screw carried by said chuck to the slotting mechanism to be slotted.

51. In a screw-slotting machine, the combination with the frame; of a rotary work-carrier having a rotating work-carrying spindle; of a reciprocating tool-carrier also having a rotating working-tool; a rotary chuck-carrier having a chuck adapted to receive a threaded-screw and supported on and adapted to be rotated on the reciprocation of said tool-carrier; a locking device, for said chuck-carrier, also supported on and adapted to be operated on the reciprocation of said tool-carrier; a slotting device also supported on and adapted to be operated on the reciprocation of said tool-carrier; and a centering-guide for the screw carried by said chuck and also supported on and adapted to be operated on the reciprocation of said tool-carrier.

52. In a screw-slotting machine, the combination with the frame; of a rotary work-carrier having a rotating work-carrying spindle; of a reciprocating tool-carrier also having a rotating working-tool; a rotary chuck-carrier having a chuck adapted to receive a threaded-screw and supported on and adapted to be rotated on the reciprocation of said tool-carrier; a chuck-opener for spreading the chuck to receive a threaded-screw; a locking device, for said chuck-carrier, also supported on and adapted to be operated on the reciprocation of said tool-carrier; a slotting device also supported on and adapted to be operated on the reciprocation of said tool-carrier; and a centering-guide for the screw carried by said chuck and also supported on and adapted to be operated on the reciprocation of said tool-carrier.

53. In a screw-slotting machine, the combination with the frame thereof; of a rotary work-carrier having rotating work-carrying spindles; of a reciprocating tool-carrier also having a rotating working-tool; a rotary chuck-carrier supported on and adapted to be rotated on the reciprocation of said tool-carrier, a series of chucks carried by said chuck-carrier and adapted to carry threaded screws; a chuck-opener pivoted on the frame; means for operating said chuck-opener on the reciprocation of the tool-carrier to spread the chucks and permit said chucks to receive threaded-screws from the rotating work-carrying spindles supported by the rotating work-carrier; a locking device, for said chuck-carrier, supported on and adapted to be operated on the reciprocation of said tool-carrier, and adapted to engage the chuck-carrier and prevent rotation thereof; a centering-guide for the screws carried by said chucks and also supported on and adapted to be operated on the reciprocation of said tool-carrier to center the heads of the screws carried by said chucks when the same are in position to be slotted; a slotting device also supported on and adapted to be operated on the reciprocation of the tool-carrier to slot the heads of the screws carried by the chucks of the rotary chuck-carrier; and means for reciprocating said tool-carrier; whereby the locking device for the chuck-carrier, the chuck-opener for the chucks, the centering-guides for the heads of the screws, and the slotting device will be placed in automatic operation.

54. In a screw-slotting machine, the combination with a reciprocating tool-carrier; of a rotary chuck-carrier having a chuck adapted to carry a screw to be slotted; chuck-opening mechanism for spreading the chuck to permit the same to receive a threaded-screw to be slotted; guide mechanism for centering the head of the screw carried by said chuck; mechanism for slotting the screw carried by said chuck; ejecting mechanism for the slotted-screw: and locking mechanism for the chuck-carrier; said centering guide mechanism, slotting mechanism, chuck-opening mechanism, and screw-ejecting mechanism being adapted to be operated on the forward movement of the reciprocating tool-carrier, and said locking mechanism and rotary chuck-carrier being adapted to be operated on the backward movement of the reciprocating tool-carrier.

55. In a screw-slotting machine, the combination with a reciprocating tool-carrier; of a rotary chuck-carrier having a chuck adapted to carry a screw to be slotted; chuck-opening mechanism for spreading the chuck to permit the same to receive a threaded-screw to be slotted; guide mechanism for centering the head of the screw carried by said chuck; mechanism for slotting the screw carried by said chuck; ejecting mechanism for the slotted-screw, and locking mechanism for the chuck-carrier; said centering guide mechanism, slotting mechanism, and screw-ejecting mechanism being supported on and adapted to be operated together with the chuck-opening mechanism on the forward movement of the reciprocatory tool-carrier; and said locking mechanism and rotary chuck-carrier being also supported on, and adapted to be operated on the backward movement of, said reciprocating tool-carrier.

56. In a screw-slotting machine, the combination with a rotary work-carrier having a rotating work-carrying spindle; of a reciprocating tool-carrier also having a rotating work-carrying tool; a rotary chuck-carrier having a chuck adapted to carry a screw to be slotted; chuck-opening mechanism for spreading the chuck to permit the same to receive a threaded-screw to be slotted; guide mechanism for centering the head of a screw carried by said chuck; mechanism for slotting the screw carried by said chuck; ejecting mechanism for the slotted-screw; and locking mechanism for the chuck-carrier; said centering guide mechanism, slotting mechanism, and screw-ejecting mechanism being supported on and adapted to be operated together with the chuck-opening mechanism on the forward movement of the reciprocating tool-carrier; and said locking mechanism and rotary chuck-carrier being also supported on and adapted to be operated on the backward movement of said reciprocating tool-carrier.

57. In a screw-slotting machine, the combination with a reciprocating carrier-frame; of a rotary chuck-carrier having a chuck adapted to carry a screw to be slotted; chuck-opening mechanism for spreading the chuck to permit the same to receive a threaded-screw to be slotted; guide mechanism for centering the head of the screw carried by said chuck; mechanism for slotting the screw carried by said chuck; ejecting mechanism for the slotted-screw, and locking mechanism for the chuck-carrier; said centering guide mechanism, slotting mechanism, and screw-ejecting mechanism being supported on and adapted to be operated together with the chuck-opening mechanism on the forward movement of the reciprocating carrier-frame; and said locking mechanism and rotary chuck-carrier being also supported on and adapted to be operated on the backward movement of said reciprocating carrier-frame.

REINHOLD HAKEWESSELL.
EDWIN C. HENN.

Witnesses:
  FRED. J. DOLE,
  S. W. POTTS.